United States Patent
Gudlavalleti et al.

(10) Patent No.: US 7,572,432 B2
(45) Date of Patent: Aug. 11, 2009

(54) METHOD AND ARTICLE FOR PRODUCING HYDROGEN GAS

(75) Inventors: Sauri Gudlavalleti, Albany, NY (US); Michael Bowman, Niskayuna, NY (US); Chellappa Balan, Niskayuna, NY (US); Shailesh Singh Bhaisora, Bangalore (IN); Andrei Colibaba-Evulet, Clifton Park, NY (US); Narayan Ramesh, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 1012 days.

(21) Appl. No.: 10/823,954

(22) Filed: Apr. 13, 2004

(65) Prior Publication Data

US 2005/0226809 A1   Oct. 13, 2005

(51) Int. Cl.
  C01B 3/22   (2006.01)
  C01B 3/24   (2006.01)
  C01B 3/26   (2006.01)
  B01J 7/00   (2006.01)
(52) U.S. Cl. .......................... 423/650; 48/61; 252/373; 423/651; 423/652; 423/653; 423/654
(58) Field of Classification Search .................. 423/652, 423/653, 654, 651, 650; 252/373
  See application file for complete search history.

(56) References Cited

U.S. PATENT DOCUMENTS

| | | | |
|---|---|---|---|
| 2,606,826 A * | 8/1952 | Jacolev et al. ............ 48/198.3 |
| 3,656,905 A | 4/1972 | Smith et al. | |
| 4,186,181 A | 1/1980 | Giammarco et al. | |
| 5,139,002 A | 8/1992 | Lynch et al. | |
| 5,154,736 A | 10/1992 | Mifflin | |
| 5,900,031 A | 5/1999 | Bloomfield | |
| 6,068,673 A | 5/2000 | Bloomfield | |
| 6,103,143 A | 8/2000 | Sircar et al. | |
| 6,488,838 B1 * | 12/2002 | Tonkovich et al. .......... 208/108 |
| 6,680,044 B1 * | 1/2004 | Tonkovich et al. .......... 423/652 |
| 6,793,910 B1 * | 9/2004 | Lyons et al. ............... 423/650 |
| 6,849,247 B1 * | 2/2005 | Wagaman et al. ........... 423/657 |
| 7,250,151 B2 * | 7/2007 | Tonkovich et al. .......... 423/659 |
| 7,384,620 B2 * | 6/2008 | Bowman et al. ......... 423/648.1 |
| 2002/0114747 A1 * | 8/2002 | Marchand et al. .......... 422/198 |
| 2003/0154654 A1 * | 8/2003 | Goebel ..................... 48/198.3 |
| 2004/0209131 A1 * | 10/2004 | Bolton et al. ................. 429/17 |

OTHER PUBLICATIONS

U.S. Appl. No. 10/617,548, filed Jul. 10, 2003, Bowman et al.
JP2002061541. Publication Date Feb. 28, 2002. Internal Combustion Engine System with Substance converting Device.
Zinn, et al., "Investigation of a Novel Reciprocating Compression Reformer for Use in Solid Oxide Fuel Cell Systems". Fuel Cell Science, Engineering and Technology. pp. 403-409 (2003).

* cited by examiner

*Primary Examiner*—Wayne Langel
(74) *Attorney, Agent, or Firm*—Patrick K. Patnode

(57) ABSTRACT

Disclosed herein is a method comprising combusting a feed stream to form combustion products; and reforming the combustion products to produce a gaseous composition comprising hydrogen. Disclosed herein too is a method for producing hydrogen comprising introducing a feed stream comprising natural gas and air or oxygen into a cyclical compression chamber; compressing the feed stream in the cyclical compression chamber; combusting the feed stream in the cyclical compression chamber to produce combustion products; discharging the combustion products from the cyclical compression chamber into a reforming section; and reforming the combustion products with steam in the reforming section to produce a gaseous composition comprising hydrogen.

21 Claims, 3 Drawing Sheets

METHOD AND ARTICLE FOR PRODUCING HYDROGEN GAS

BACKGROUND OF INVENTION

This disclosure is related to a method and an article for producing hydrogen gas.

Hydrocarbon fuels are currently widely used in the production and generation of energy. Hydrogen is, however, emerging as a useful fuel because it can be reacted with oxygen, in hydrogen-consuming devices, to produce energy and water with virtually no byproduct emissions. It is therefore useful to produce hydrogen for power generation in a manner that is both economical as well as efficient. It is also desirable to generate hydrogen by methods that lend themselves to easy adaptation in existing energy utility devices.

SUMMARY OF INVENTION

Disclosed herein is a method comprising combusting a feed stream to form combustion products; and reforming the combustion products to produce a gaseous composition hydrogen gas.

Disclosed herein too is a method for producing hydrogen comprising introducing a feed stream comprising natural gas and air or oxygen into a cyclical compression chamber; compressing the feed stream in the cyclical compression chamber; combusting the feed stream in the cyclical compression chamber to produce combustion products; discharging the combustion products from the cyclical compression chamber into a reforming section; and reforming the combustion products with steam in the reforming section to produce a gaseous composition comprising hydrogen.

Disclosed herein too are devices that use the aforementioned methods to generate hydrogen.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Figure 1:
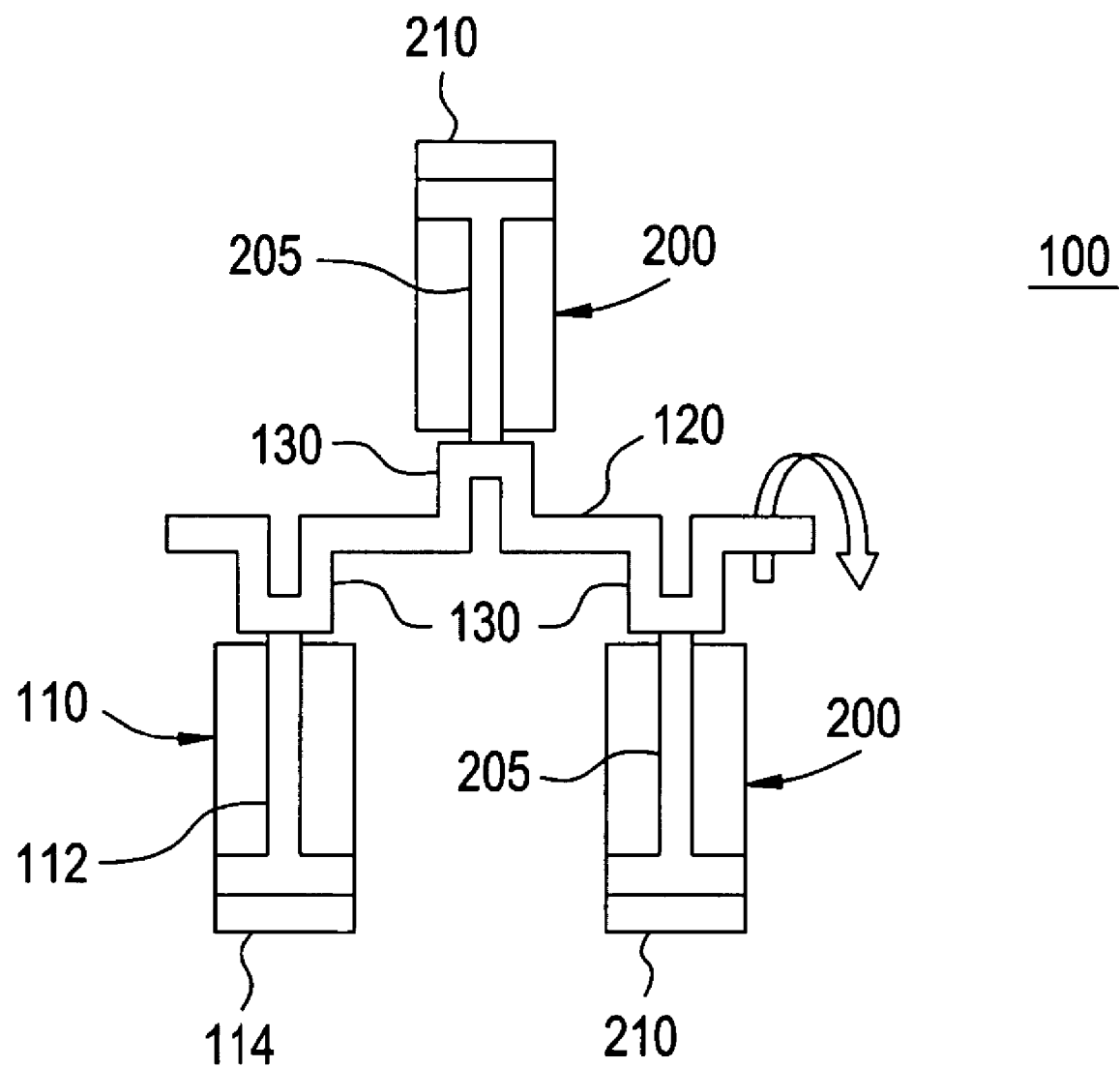
FIG. 1 is a schematic of a cross-sectional depiction of one embodiment of an article for reforming hydrocarbon fuel.

Disclosed herein is a method for producing a gaseous composition comprising hydrogen by reforming a hydrocarbon fuel that has been combusted in a combustion process. The combustion process preferably occurs within a cylinder that is in mechanical slideable communication with a reciprocating piston. The reciprocating piston is in mechanical communication with an external drive. In one embodiment, the method comprises combusting a feed stream to form combustion products; and reforming the combustion products to produce a gaseous composition comprising hydrogen. In another embodiment, a method for producing hydrogen comprises introducing a feed stream comprising natural gas and air or oxygen into a cyclical compression chamber; compressing the feed stream in the cyclical compression chamber; combusting the feed stream in the cyclical compression chamber to produce combustion products; discharging the combustion products from the cyclical compression chamber into a reforming section; and reforming the combustion products with steam and/or additional hydrocarbon in the reforming section to produce a gaseous composition comprising hydrogen. In another embodiment a catalyst may be placed in the reforming section.

The method can be advantageously used to produce a gaseous composition containing hydrogen; wherein the hydrogen is present in an amount of greater than or equal to about 0.01 weight percent (wt %), based on the total weight of gaseous composition. The method for producing hydrogen is also advantageous in that it can be used to produce high purity hydrogen (i.e., Hydrogen 6.0), if desired. The method can be employed in simple, compact, self-contained devices. Devices that produce hydrogen by employing this method can have fatigue lives exceeding 10,000 cycles.

The feed stream comprises hydrocarbons and air or oxygen and optionally steam. Suitable hydrocarbons may be either aliphatic and/or aromatic hydrocarbons. Suitable examples of hydrocarbons that may be employed in the feed stream are alkanes, alkenes, alkynes, or the like, or combinations comprising at least one of the foregoing hydrocarbons. Cyclic forms of the hydrocarbons, such as, for example, cyclic alkanes may also be used in the feed stream. Preferred hydrocarbons are alkanes or alkenes. Preferred alkanes are methane, ethane, propane, butane, pentane, hexane, heptane, octane, or the like, or combinations comprising at least one of the foregoing alkenes. Preferred examples of alkenes that may be used in the feed stream are ethylene, propylene, butene, pentene, hexene, or the like, or combinations comprising at least one of the foregoing alkenes. The most preferred hydrocarbons are high purity methane or natural gas.

The feed stream may preferably comprise a mixture of air or oxygen, hydrocarbon, and optionally steam, wherein the molar ratio of oxygen to hydrocarbon is about 0.05 to about 2.0. In one embodiment, the feed stream may comprise a mixture of air or oxygen and hydrocarbon, wherein the molar ratio of oxygen to hydrocarbon is about 0.1 to about 1.9. In another embodiment, the feed stream may comprise a mixture of air or oxygen and hydrocarbon, wherein the molar ratio of oxygen to hydrocarbon is about 0.25 to about 1.8. In yet another embodiment, the feed stream may comprise a mixture of air or oxygen and hydrocarbon, wherein the molar ratio of oxygen to hydrocarbon is about 0.5 to about 1.75.

Referring now to FIG. 1, an exemplary embodiment of a three-cylinder hydrogen reforming system (HRS) 100 is depicted. HRS 100 includes an external drive in the form of a drive cylinder 110 in mechanical communication with two internal combustion cylinders (hereinafter referred to as cyclical compression chambers,) 200. In an embodiment, the drive cylinder 110 includes a piston 112 and a cylinder 114, which receives a fuel mixture and contains a timed ignition to provide a mechanical driving force that is used to drive the two internal combustion cylinders. A driveshaft 120 with cranks 130 provides a mechanical communication between the drive cylinder 110 and each cyclical compression chamber 200 for driving each piston 205 within each cylinder 210 in a cyclical manner. While a three-cylinder hydrogen reforming system 100 is depicted in FIG. 1, any arrangement of drive system cylinders and internal combustion cylinders may be employed as desired, thereby providing a scalable hydrogen reforming system 100. Further, while the reciprocating piston generally facilitates the compression of the feed stream within the cylinder, other modes of compression such as that effected by pistons that rotate may also be used.

While the external drive for the hydrogen reforming system may use energy derived from combustion for driving the cyclical compression chambers, alternate forms of energy may also be used for driving the cyclical compression chambers. Examples of such alternate forms of energy are electricity, wind, solar power, steam, water, or the like, or a combination comprising at least one of the foregoing forms of energy.

Figure 2:
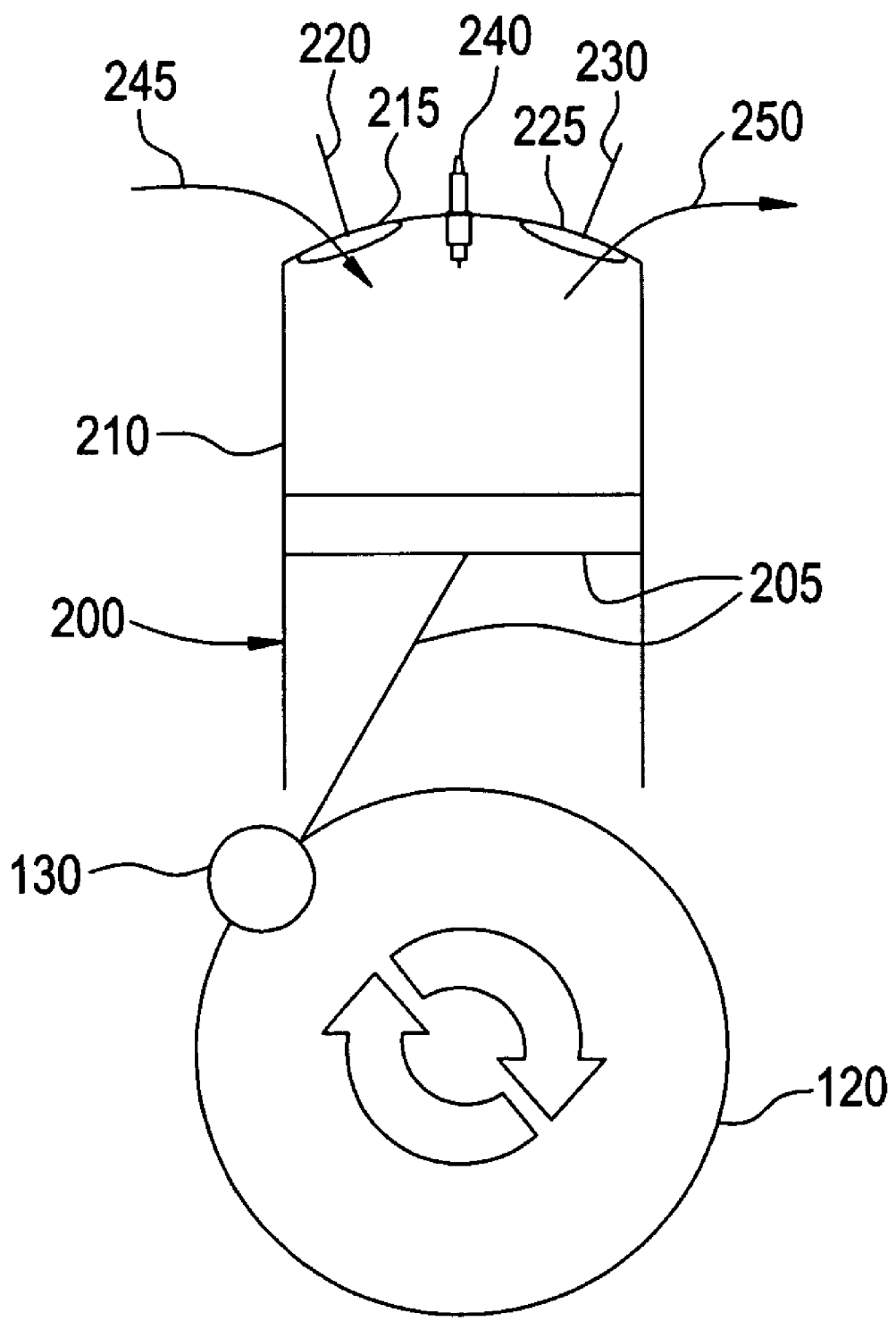
FIG. 2 is a more detailed schematic illustration of at least a portion of the article of FIG. 1.

Referring now to FIG. 2, an exemplary single cyclical compression chamber 200 is depicted having an entry port 215 with an entry valve 220 for receiving the feed stream, and an exit port 225 with an exit valve 230 for delivering combusted product gas to a reforming section. Cyclical compression chamber 200 is also equipped with an ignition source 240, such as, for example, a spark plug, to initiate combustion of the feed stream. In one embodiment, the feed stream may be pre-heated prior to entering the cyclical compression chamber 200 through entry port 215.

The cyclical compression chamber 200 can have a volume of greater than or equal to about 5 milliliters (ml). In one embodiment, the cyclical compression chamber has a volume of greater than or equal to about 10 ml. In another embodiment, the cyclical compression chamber has a volume of greater than or equal to about 30 ml. In yet another embodiment, the cyclical compression chamber has a volume of greater than or equal to about 100 ml. In yet another embodiment, the cyclical compression chamber has a volume of greater than or equal to about 500 ml. In yet another embodiment, the cyclical compression chamber has a volume of greater than or equal to about 1000 ml.

Figure 3:
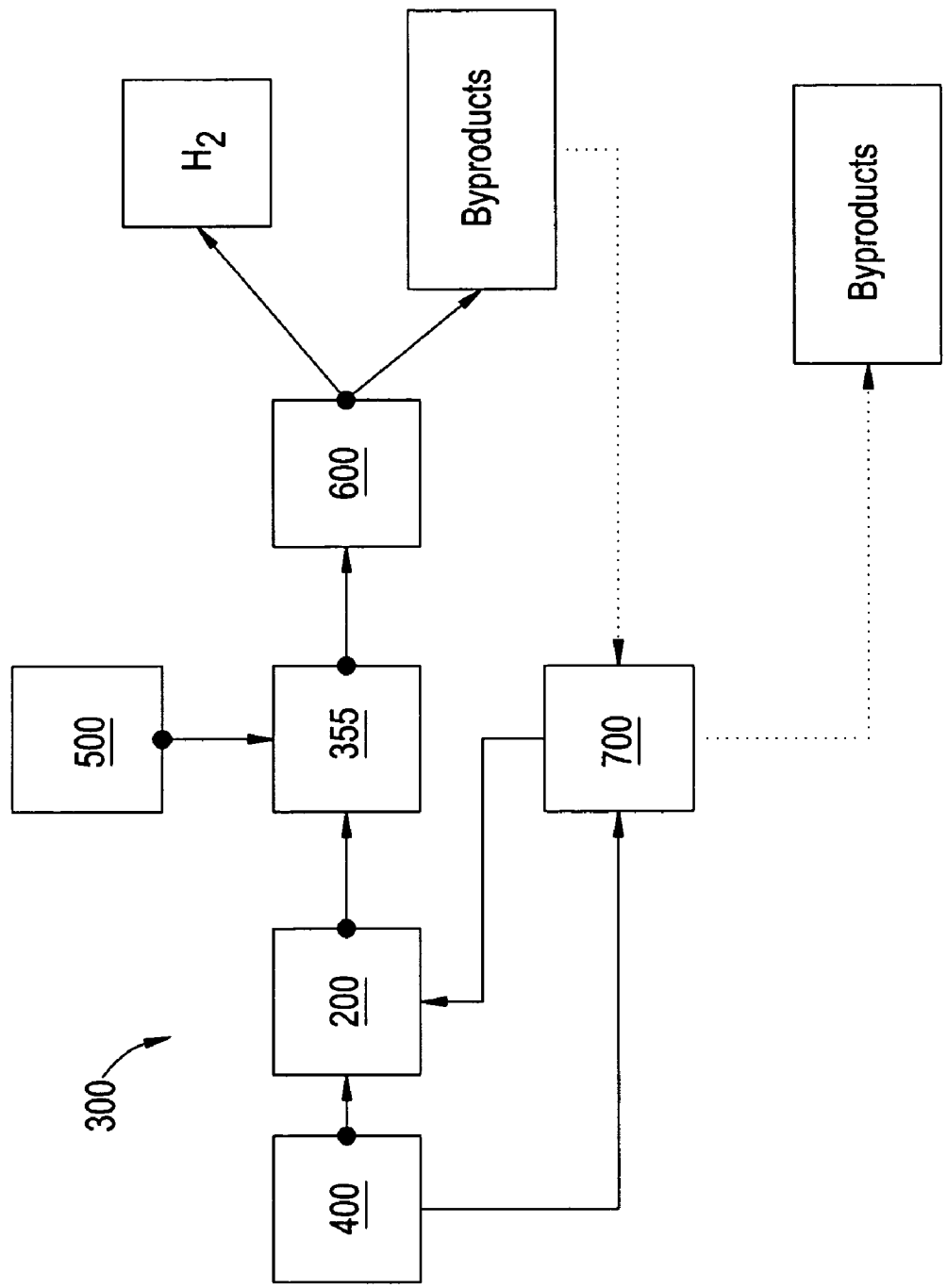
FIG. 3 is a block diagram of one embodiment of a method for reforming hydrocarbon fuel.

Referring now to FIG. 3, an exemplary embodiment relating to the method of production of hydrogen in HRS 100 will be detailed. The feed stream 400 comprising a hydrocarbon, air or oxygen, and optionally steam is introduced into the cyclical compression chamber 200 either separately or in the form of a mixture. The molar ratio of oxygen to hydrocarbon in the feed stream 400 is generally about 0.1 to about 2. As noted above, the feed stream may be preheated prior to introduction into the cyclical compression chamber 200. The feed stream may also be precompressed prior to introduction into the cyclical compression chamber 200. In one embodiment, the air or oxygen may be at a different temperature and pressure from the temperature and pressure of the hydrocarbon prior to introduction into the cyclical compression chamber. In another embodiment, the air or oxygen may be at the same temperature and pressure as the temperature and pressure of the hydrocarbon prior to introduction into the cyclical compression chamber. When the hydrocarbon and air or oxygen are introduced separately into the cyclical compression chamber 200, it may be desirable to introduce the air or oxygen prior to the introduction of the hydrocarbon. Alternatively, it may be desirable for the hydrocarbon to be introduced prior to the introduction of the air or oxygen.

In one embodiment, the feed stream 400 may be supplied at a temperature greater than or equal to about ambient temperature (which can be about 18 to about 28° C.), to less than or equal to about 800° C., prior to introduction in the cyclical compression chamber 200. The temperature of the feed stream is limited by the occurrence of undesirable chemical reactions in the feed stream, such as cracking of the fuel, and heat tolerance of the materials of construction. The preferred feed stream temperature is about 300 to about 500° C.

If the hydrocarbon is introduced separately from the air or oxygen into the cyclical compression chamber 200, then the hydrocarbon may be preheated to a temperature of about 100 to about 400° C., prior to introduction. The preferred preheating temperature is about 350° C. The air or oxygen may be preheated to a temperature of 100 to about 800° C., prior to introduction. The preferred preheating temperature for air or oxygen is about 500° C.

In another embodiment, the feed stream 400 may be precompressed to a pressure of about 1 to about 5 kg/cm$^2$ prior to introduction in the cyclical compression chamber 200. The preferred precompression pressure is about 2 kg/cm$^2$.

The feed stream 400 is subjected to compression as well as to combustion in the cyclical compression chamber 200. The volumetric compression ratio within the cyclical compression chamber 200 during compression is greater than or equal to about 3:1, preferably greater than or equal to about 5:1, preferably greater than or equal to about 7:1, and more preferably greater than or equal to about 10:1. During the combustion, the pressure in the cyclical compression chamber 200 is about 10 to about 100 kg/cm$^2$. The preferred pressure during the combustion is about 25 kg/cm$^2$. During the combustion, the temperature in the cyclical compression chamber 200 is about 800 to about 1500° C. The preferred temperature during the combustion is about 1000° C. The combustion products comprise carbon dioxide, carbon monoxide, uncombusted hydrocarbon, steam, hydrogen and the inert components of air in the feed stream, such as, nitrogen.

Following combustion, the combustion products are discharged to a reforming section 355, which is downstream of and in fluid communication with the cyclical compression chamber 200. In the reforming section 355, the combustion products are combined with steam and/or a hydrocarbon and subjected to a reforming process which produces hydrogen. The steam and/or the hydrocarbon and/or the combustion products may be introduced simultaneously or separately into the reforming section 355. When introduced separately they may be introduced in any desirable order. The reforming section 355 may optionally contain a catalyst to facilitate the reforming of the combustion products.

If the steam is introduced into the reforming section 355 separately from both the combustion products and the hydrocarbon, it is preferably introduced at a temperature of about 100 to about 800° C. and a pressure of about 10 to about 100 kg/cm$^2$. If the hydrocarbon is introduced into the reforming section 355 separate from both the combustion products and the steam, it is preferably introduced at a temperature of about ambient temperature (which is about 18 to about 28° C.) to about 500° C. and a pressure of about 1 to about 100 kg/cm$^2$. If the hydrocarbon and the steam are introduced into the reforming section 355 simultaneously, they are preferably introduced such that the mixed stream entering the reforming section is at a temperature of about 700 to about 1200° C. and a pressure of about 1 to about 50 kg/cm$^2$.

The reforming section may comprise a batch reactor or a continuous reactor. The reactors may comprise a fluidized bed, a cylindrical compression chamber, a plug flow reactor, catalytic oxidation reactors, fuel reformer catalytic reactors, or the like. A preferred reactor is a plug flow reactor such as a continuously stirred tank reactor. Continuously stirred tank reactors have advantages of being able to carry out reactions on a large scale (i.e., high conversion per unit volume) coupled with a low operating cost. Both homogenous reactions as well as heterogeneous reactions may be conducted in these reactors.

Catalysts that may be used in the reforming section 355 for the reforming reaction are steam reforming catalysts and/or water gas shift catalysts. Suitable examples of the steam reforming catalysts and the water gas shift catalysts are metals, alloys, and oxides such as transition metal oxides, alkali earth metal oxides or main group element oxides. The catalysts may be homogenous or heterogeneous catalysts. It is generally desirable for the catalysts to be monolithic catalysts. Suitable examples of metals are nickel, iron, zinc, copper, noble metals such as palladium, platinum, rhodium, or the like, or combinations comprising at least one of the foregoing metals. Suitable examples of such oxides are nickel oxide, magnesium oxide, aluminum oxide, manganese oxide, zinc oxide, copper oxide, iron oxide, or the like, or combinations comprising at least one of the foregoing oxides.

In one embodiment, the metal catalysts can be disposed on supports having a high surface area. Suitable supports are fumed silica, fumed alumina, alpha alumina, gamma-alumina, delta alumina, titania, ceria, or the like, or a combination comprising at least one of the foregoing supports. It is generally desirable for the porous supports to have a surface area of greater than or equal to about 10 square meters per gram ($m^2$/grn), preferably greater than or equal to about 20 $m^2$/gm, and more preferably greater than or equal to about 100 $m^2$/gm. The catalysts may be deposited on the porous supports by ion implantation, chemical vapor deposition, sputtering, from a suitable solvent such as alcohols, acetone, water, or the like. Supported catalysts are generally employed when the reforming section is a fluidized bed.

The preferred catalysts for plug flow reactors are monolithic catalysts, such as nickel, iron, zinc, copper, noble metals such as palladium, platinum, rhodium, or the like, or combinations comprising at least one of the foregoing metals. Monolithic catalysts permit short contact times with the reactants. They are further advantageous in that chemical reactions can take place not only at the catalytic surface, but also in the gas phase.

In the reforming section 355 the combustion products react with the steam to produce hydrogen according to the reactions detailed in Equations (I) and (II) below.

$$C_xH_y + x\, H_2O \rightarrow x\, CO + (xy/2)H_2 \quad \text{(I)}$$

$$CO + H_2O \rightarrow CO_2 + H_2 \quad \text{(II)}$$

Equation (I) above is generally termed the steam reforming (SMR) reaction, while Equation (II) is generally termed the water-gas shift reaction. Both reactions may take place in the reforming section. When the hydrocarbon being reacted in Equation (I) is methane or natural gas, the reaction is termed the steam methane reforming (SMR) reaction.

The reformed gas that comprises hydrogen, carbon monoxide, carbon dioxide, nitrogen, moisture, and other unreacted components of the feed stream is then discharged from the reforming block 355 and subjected to purification in a gas separator 600. In one embodiment, the separation of hydrogen from the reformed gas is facilitated by a gas separation technique. In order to effect the separation of hydrogen, the reformed gas is passed through a hydrogen gas separator. In another embodiment, the separation of hydrogen gas is effected by the pressure swing adsorption process.

In an exemplary embodiment, the gas separator 600 includes a membrane penetrable by hydrogen gas ($H_2$), but not penetrable by hydrocarbon, carbon-monoxide (CO), carbon-dioxide ($CO_2$), or moisture ($H_2O$), thereby enabling the separation of hydrogen gas from the reformed gas. The hydrogen gas may then be used or stored in any desirable manner. Inorganic and organic membranes may be advantageously used for gas separation. While inorganic membranes facilitate the separation of hydrogen above 500° C., organic membranes are generally preferred at temperatures of about 200° C. The organic membranes are preferably polymeric membranes. Suitable polymers are thermoplastic polymers, thermosetting polymers, or a combination of thermoplastic polymers with thermosetting polymers. Polyimide membranes are preferred for separating hydrogen gas.

As noted above, hydrogen gas may be separated by the pressure swing adsorption (PSA) process. In this process, the gases produced in the reformer section are subjected to high pressure adsorption and low pressure desorption cycles in multiple beds to separate hydrogen gas. Membrane separation is the preferred method for separation of hydrogen.

In another embodiment, separated byproducts from the reformed gas may be optionally used to extract energy that may be recycled back into the system to preheat the feed stream. The energy may be extracted and exchanged via a heat transfer device 700, such as a heat exchanger. In this manner, heat from the byproducts may be used to preheat the feed stream prior to introduction into the cyclical compression chamber.

In one exemplary embodiment, in one manner of proceeding in the cyclical compression chamber 200, a mixture of air and natural gas (high purity methane) in a molar ratio of less than or equal to about 0.6 can be preheated to a temperature of about 300° C. at standard pressure. The mixture may be compressed in the cyclical compression chamber 200 to a volumetric compression ratio of greater than or equal to about 7:1. As a result of the compression, the mixture may attain a temperature of about 350° C. and a pressure of about 20 kg/cm². The compressed mixture may then be combusted in the cyclical compression chamber 200 resulting in combustion products. The combustion products have a pressure of about 20 kg/cm² and temperature of about 1000° C.

In another exemplary embodiment, related to the combustion of the feed stream in the cyclical compression chamber 200, a feed stream comprising 1 mole of methane and 0.5 moles of oxygen, may be preheated to about 300° C. The feed stream may be introduced into the cyclical compression chamber where it can be compressed at a volumetric compression ratio of about 10:1 and ignited at a temperature of about 812° C. and a pressure of about 18 kg/cm . The combustion products can comprise about 0.106 moles methane, about 1.7 moles hydrogen, about 0.88 moles carbon monoxide, and about 0.018 moles carbon dioxide. The temperature and pressure of the combustion products are about 1086° C. and about 31 kg/cm² respectively.

The combustion products from the aforementioned exemplary embodiments can then be exhausted into the reforming section 355. Preheated steam at a temperature of about 500° C. and a pressure of about 20 kg/cm² can be introduced into the reforming section 355 to facilitate the reforming reactions. The molar ratio of steam to combustion products is about 2:1 to about 3:1. Reforming occurs in the reforming section 355 at temperatures of about 950° C. and pressures of about 18 kg/cm². After reforming, the reformed product, which is a gaseous composition comprising hydrogen is subjected to a purification step to isolate hydrogen from the other byproducts.

One measure of the effectiveness of the process is the extent of conversion of the hydrocarbon supplied in the feed stream. The method is advantageous in that it can be used to obtain hydrogen converted at a hydrocarbon conversion rate greater than or equal to about 5%. In one embodiment, the gaseous composition obtained after the reforming has been converted at a hydrocarbon conversion rate of greater than or equal to about 10%. In another embodiment, the gaseous composition obtained after the reforming has been converted at a hydrocarbon conversion rate of greater than or equal to about 25%. In yet another embodiment, the gaseous composition obtained after the reforming has been converted at a hydrocarbon conversion rate of greater than or equal to about 50%. In yet another embodiment, the gaseous composition obtained after the reforming has been converted at a hydrocarbon conversion rate of greater than or equal to about 75%. In yet another embodiment, the gaseous composition obtained after the reforming has been converted at a hydrocarbon conversion rate of greater than or equal to about 95%.

Another method of the effectiveness of a reforming process is efficiency which is defined by the ratio of the calorific value of the hydrogen produced to the sum of the calorific value of hydrocarbon supplied and other heat and/or work supplied to the process. The method is further advantageous in that it displays an efficiency greater than or equal to about 25%. In one embodiment, the method has an efficiency of greater than or equal to about 35%. In another embodiment, the method has an efficiency of greater than or equal to about 45%. In yet another embodiment, the method has an efficiency of greater than or equal to about 55%. In yet another embodiment, the method has an efficiency of greater than or equal to about 65%. In yet another embodiment, the method has an efficiency of greater than or equal to about 75%.

The method is further advantageous in that a device employing the method may be free of a heat exchanger if desired. The method is particularly advantageous in that the use of a heat exchanger operating at temperatures at greater than or equal to about 600° C. may be avoided. The method for producing hydrogen may be employed in simple, compact, self-contained devices. Devices that produce hydrogen by employing this method may have fatigue lives exceeding 10,000 cycles. The system generally may be used to produce hydrogen at low flow rates and displays efficiencies exceeding 25%.

The method is further advantageous in that it involves pressurizing the feed streams early in the process, as a result of which higher mass flow throughput rates can be achieved for a given size of system components. In addition, the higher pressure is more favorable for downstream hydrogen purification processes that may depend on pressure. When pressurization for the abovementioned benefits is required, it is generally more efficient to pressurize a feed stream comprising of hydrocarbon and air/oxygen rather than to pressurize a reformate stream or combustion exhaust stream comprising a mixture of hydrogen, hydrocarbon, nitrogen, carbon dioxide, carbon monoxide, steam, other non-reacting components and combustion products. Devices employing the method may be advantageously used in vehicles, aircraft, ships, residential and office buildings, or the like, to generate energy.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The use of the terms first, second, and the like do not denote any order or importance, but rather the terms first, second, and the like are used to distinguish one element from another. Furthermore, the use of the terms a and an do not denote a limitation of quantity, but rather denote the presence of at least one of the referenced item.

The invention claimed is:

1. A method comprising:
partially combusting a feed stream in a cyclical compression chamber in mechanical communication with a reciprocating piston or a rotary piston to form combustion products; and
reforming the combustion products to produce a gaseous composition comprising hydrogen.

2. The method of claim 1, wherein the feed stream comprises a mixture of air or oxygen and hydrocarbon, wherein a molar ratio of oxygen to hydrocarbon is about 0.05 to about 2.0.

3. The method of claim 2, wherein the hydrocarbon is selected from a group consisting of alkenes, alkenes, alkynes, and a combination comprising at least one of the foregoing hydrocarbons.

4. The method of claim 3, wherein the hydrocarbon is methane or natural gas.

5. The method of claim 1, wherein a temperature of the feed stream prior to combustion is about 18 to about 800°C.

6. The method of claim 1, further comprising utilizing heat from a byproduct to preheat the feed stream prior to introduction into the cyclical compression chamber.

7. The method of claim 1, further comprising compressing the feed stream prior to combustion.

8. The method of claim 1, wherein the pressure within the cyclical compression chamber has a volumetric compression ratio of greater than or equal to about 3:1.

9. The method of claim 1, wherein the reforming occurs within a reforming section, and wherein the reforming section is downstream of and in fluid communication with the cyclical compression chamber.

10. The method of claim 9, wherein pre-heated steam or a pre-heated mixture of steam and hydrocarbon is introduced into the reforming section prior to reforming.

11. The method of claim 9, wherein the reforming section contains a catalyst.

12. The method of claim 10, wherein the catalyst is a metal, an oxide of a transition metal, an oxide of an alkali earth metal, an oxide of a main group element or a combination comprising at least one of the foregoing catalysts.

13. The method of claim 1, further comprising separating hydrogen from the gaseous composition comprising hydrogen.

14. A method for producing hydrogen comprising:
introducing a feed stream comprising natural gas and air or oxygen into a cyclical compression chamber;
compressing the feed stream in the cyclical compression chamber;
partially combusting the feed stream in the cyclical compression chamber to produce combustion products;
discharging the combustion products from the cyclical compression chamber into a reforming section; and
reforming the combustion products with steam in the reforming section to produce a gaseous composition comprising hydrogen.

15. The method of claim 14, wherein the feed stream comprises a mixture of air or oxygen and methane, wherein a molar ratio of oxygen to methane is about 0.10 to about 0.50.

16. The method of claim 14, wherein a temperature of the feed stream prior to combustion is about 18 to about 800°C.

17. The method of claim 14, wherein the compression is conducted at a volumetric compression ratio of greater than or equal to about 3:1.

18. The method of claim 14, wherein the ratio of added steam to carbon content in the hydrocarbons in the combustion products in the reforming section is about 1 to about 4.

19. The method of claim 14, further comprising separating hydrogen from the gaseous composition.

20. The method of claim 14, wherein the reforming section contains a catalyst.

21. The method of claim 20, wherein the catalyst is a metal, an oxide of a transition metal, an oxide of an alkali earth metal, an oxide of a main group element or a combination comprising at least one of the foregoing catalysts.

* * * * *